April 28, 1959
D. R. MANSHOLT
2,884,079
APPARATUS FOR LIFTING BULBS, TUBERS AND
ROOT PLANTS, PARTICULARLY BEETS
Filed Dec. 28, 1954
2 Sheets-Sheet 1
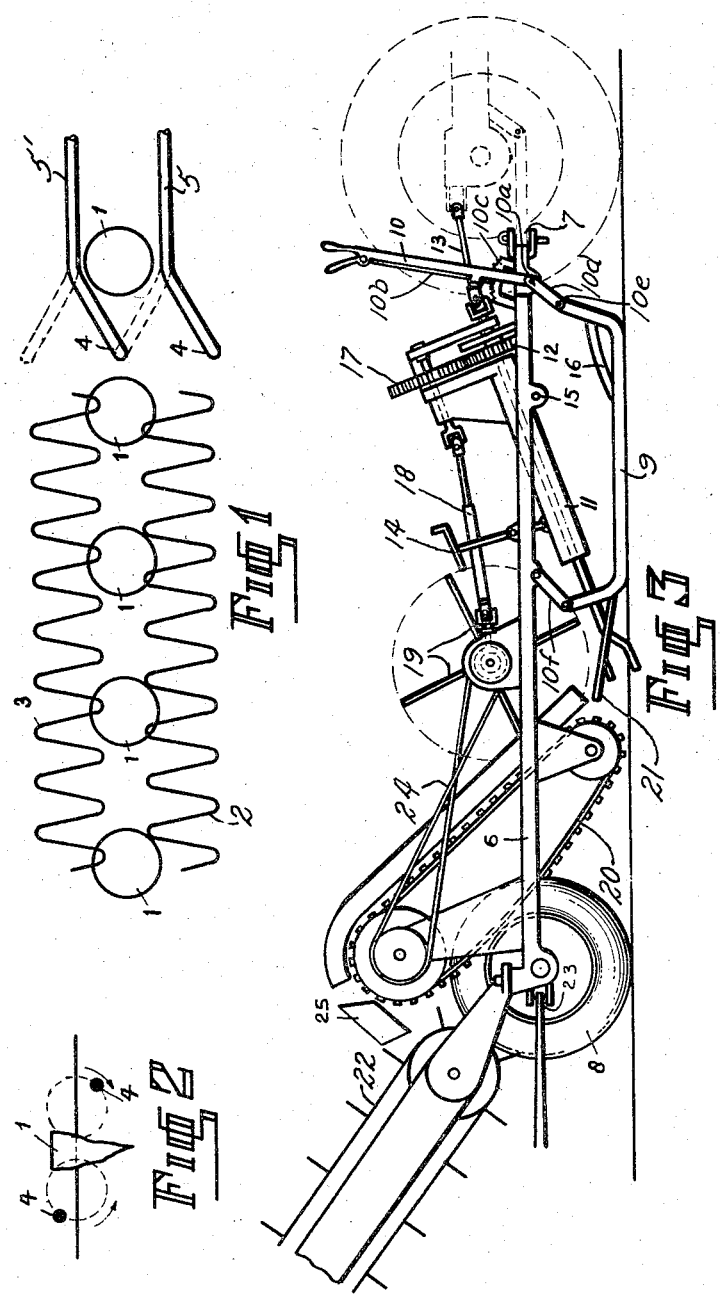
INVENTOR
DIRK ROELF MANSHOLT
BY

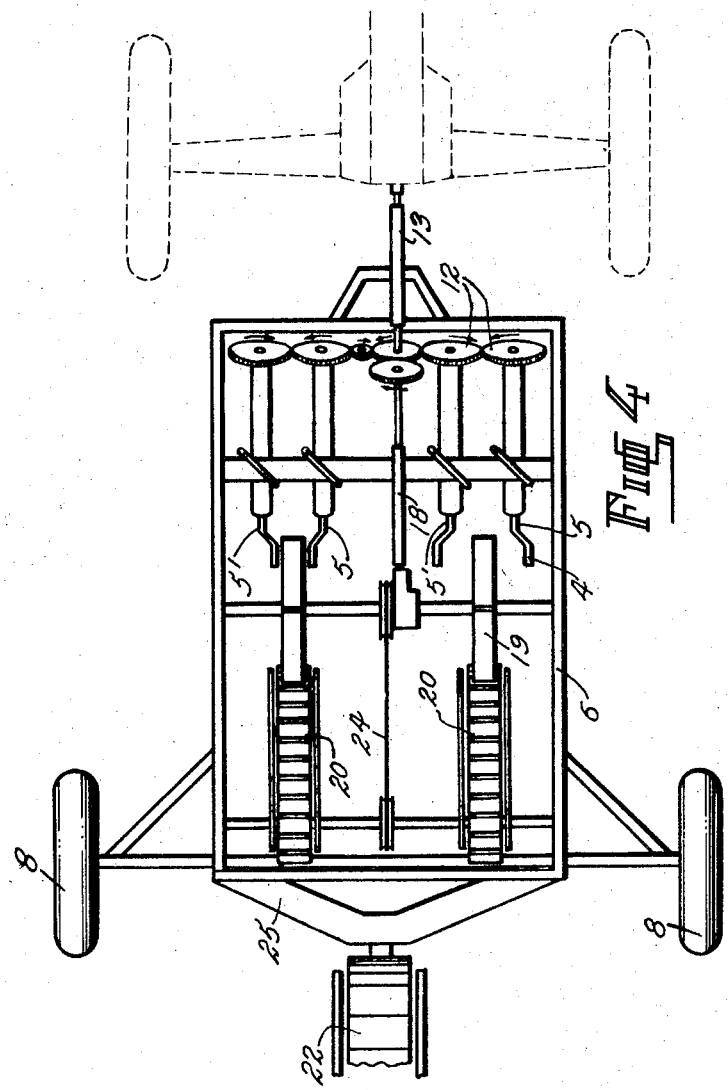

United States Patent Office 2,884,079
Patented Apr. 28, 1959

2,884,079

APPARATUS FOR LIFTING BULBS, TUBERS AND ROOT PLANTS, PARTICULARLY BEETS

Dirk Roelf Mansholt, Slootdorp, Netherlands

Application December 28, 1954, Serial No. 478,162

3 Claims. (Cl. 171—99)

My invention relates to apparatus for lifting bulbs, tubers and root plants, particularly beets and similar ball-shaped products which apparatus has a frame which is moved over one or more rows of such plants and has a lifting mechanism secured to it.

The well-known lifting mechanisms generally comprise a V-shaped member, which is pulled through the soil so that the beets or the like are trapped by the V-shaped member and are forced upward due to its wedging effect. This member, which is stationary in relation to the apparatus, requires the exertion of a very great force to pull it through the soil and since beets and like bulbous products are generally grown on heavy ground or soil powerful tractors are indispensable when the soil is hard and dry. In addition, clay and other materials adhere strongly to the plants during lifting operation.

My invention has for its object to provide means requiring less tractive power for the lifting mechanism than hitherto and allowing the beets to leave the soil with the minimum amount of adhering earth. This is achieved by constructing the lifting mechanism with a lifting member which is adapted to move at least alongside the plant and in relation to the frame and which reaches down to or into the soil. This member is furthermore shaped so that it periodically reaches into the path of the plant required to be lifted, the direction of said movement being such that when it makes contact with the plant an upwardly directed force is exercised on the latter. It is another object of the invention to provide means affording the movement of the lifting member in an inclined manner relative to the forward direction of movement of the lifting apparatus. In a practical embodiment of the present invention the apparatus comprises two moving lifting members which enable the plant to be located between them, a particular advantage being obtained if the moving lifting member performs a rotary movement and the part which periodically has contact with the plant to be lifted, is spaced apart from and lies outside the axis of rotation so that there is no need for the actual lifting member to be pulled through the earth continuously. However, as an alternative, if two rotary lifting members are used for a single row of plants they may be arranged to execute movements in opposite directions. For some plants it is preferable that the part of the lifting member which reaches down to or into the ground should be arranged outside the axis of rotation and instead of executing a rotary movement should describe an oscillatory path around the latter. When using rotary lifting members it is preferable that the lifting members arranged to rotate on each side of the plant should be out of phase with each other.

In order that the invention may be clearly understood and readily carried into effect one embodiment thereof will now be described more fully with reference to the accompanying drawings, in which:

Figure 1 is a diagram illustrating the path of the lifting members according to the invention;

Figure 2 shows diagrammatically the manner in which the plant is jostled out of the ground;

Figure 3 is a side elevation of the lifting apparatus and

Figure 4 is a plan view thereof with parts omitted for the sake of clarity.

Although the lifting apparatus is suitable for lifting any kind of bulbs, tubers and root plants, it will be described hereinafter as though concerned solely with lifting sugar beets. The apparatus shown in the drawings comprises rotary lifting members.

Figure 1 is a plan view of sugar beets having the leaves and the top part of the sugar beet removed therefrom for illustrating with clarity the manner of operation of the mechanism. The two sinusoidal curves 2 and 3 represent in plan the direction of travel of the outer ends or extremities 4 of the rotary lifting means or rods 5 and 5' in relation to the beets. These rods 5 and 5' rotate about their longitudinal axis, so that their somewhat crank-shaped ends 4, which may also be curved in a suitable manner in relation to the longitudinal axis, oscillate about that axis. It will be obvious that during the forward rotary movement of the rods 5 and 5' on each side of the row of beets the ends 4 will abut against the beets 1 so as to dislodge them from the ground and push them upwards.

The ends 4 of the two rods are out of phase with each other, as may be clearly seen from Figure 2. On both sides in succession, the beet is thus given an upwardly directed blow which results in its being pushed upwards. This dispenses with the necessity for pulling heavy wedge shaped members through the ground, since pulling the rotary rod ends 4 through the ground during the lower half of their rotary movements requires very little tractive power.

The lifting apparatus described by way of example comprises a frame 6, the front of which is secured to the tractor at 7. At the rear end frame 6 has supporting wheels 8, whereas the front has slides or skids 9 which are arranged so as to be adjustable in vertical direction.

The front of the frame may be vertically adjusted by means of a lever 10. Lever 10 pivotable to frame 6 at 10a is provided with a detent 10b engageable with toothed segment 10c secured to frame 6, so that the lever may be shifted to any desired position. The lever is provided with an extension 10d to which are pivotably secured at 10e the front ends of skids 9. The rear ends of skids 9 are secured and are pivotable with respect to frame 6 by means of link 10f. Skid 9 may thus be adjusted in a vertical direction to vary the distance of frame 6 from the ground, and thereby the operating depth of the device. Supported on the frame is the actual lifting mechanism 11 which comprises lifting rods 5 whose rear ends 4 are curved, so that the assembly is shaped, for example, in the form of a crank. The other end of the lifting rod 5 is provided with a gear wheel 12 for the lifting rods to be actuated through the interposition of shaft 13 from the take off shaft of the tractor. The lifting mechanism is pivoted at 15 on a pin so that the angle of the lifting rods 5 in relation to the soil is adjustable by means of crank 14 secured to frame 6 and the lifting mechanism.

The operating depth may be adjusted by means of the skids. In addition, the skids are provided with spurs or guides 16 which automatically align the lifting apparatus relatively to the beets. The rotary lifting rods are thus positioned in relation to the beets so as to jostle them upwards. The gear wheels 12 mesh with a gear wheel 17 which, with the interposition of a telescopic shaft 18 having a universal joint spins a rotary beater mechanism 19 whose function is to throw the beets carried up between the lifting rods 5 onto a lifting conveyor 20, the skids being provided with a screen 21 to prevent the beets from escaping laterally. Screen 21 is secured to skids 9 adjacent to lifting rods 5 and beater mechanism 19 in such a manner that they do not interfere with the operation of either one.

After the beets are raised an elevator 22 loads the beets onto a wagon, which may be coupled to the lifting apparatus at 23. The conveyor 20 consists of an endless belt provided with transverse spaced strips which engage the beets delivered by the rotary beater mechanism 19 and deposit the beets on conveyor belt 22 of an elevator (not shown). The conveyor 20 is operated by means of a flexible driving band 24 of the beater mechanism. The lifting members are preferably designed for dealing with two rows. In this case use is made of two conveyors 20. A collecting channel 25 enables the beets to reach the conveyor 22.

It is obvious that a great number of modifications may be designed without departing from the scope of the invention as defined in the appended claims.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An apparatus for lifting plants, in particular beets out of the soil; comprising a wheeled frame adapted to move over one or more rows of said plants, rotation imparting means supported by said frame, lifting means supported on said frame, said lifting means comprising at least one pair of substantially parallelly disposed rod members spaced from each other so as to pass one on either side of a respective row of plants, one end of each of said rod members being operatively connected to said rotation imparting means, each of said rods having the opposite end thereof intending at an angle with respect to the plane of the axis of rotation of said rods, each said opposite end being substantially crank-shaped and be inclinedly directed toward said soil, said crank-shaped opposite ends of said rods being arranged to rotate in opposite directions and out of phase with one another for contact with said soil, whereby said crank-shaped ends of said rods cooperate with each other to alternately impart a laterally and upwardly directed force to said plants for lifting these out of the soil.

2. Apparatus according to claim 1, including adjusting means on said frame and connected with said lifting means for varying the angle of inclination of said opposite rod ends relative to the surface of the soil.

3. Apparatus according to claim 2, wherein said adjusting means includes at least one pair of skid members pivotably secured to said frame and disposed substantially parallel thereto and spaced downwardly therefrom, and adjustable hand lever means operatively secured to said frame and said skid members for varying the space between said frame and said skid members.

References Cited in the file of this patent

UNITED STATES PATENTS

| 1,060,968 | Bocker | May 6, 1913 |
| 1,155,319 | Moller et al. | Sept. 28, 1915 |
| 1,299,825 | Devey | Apr. 8, 1919 |
| 2,595,340 | Diethelm | May 6, 1952 |

FOREIGN PATENTS

| 1,091,380 | France | Oct. 27, 1954 |